Figure 1:
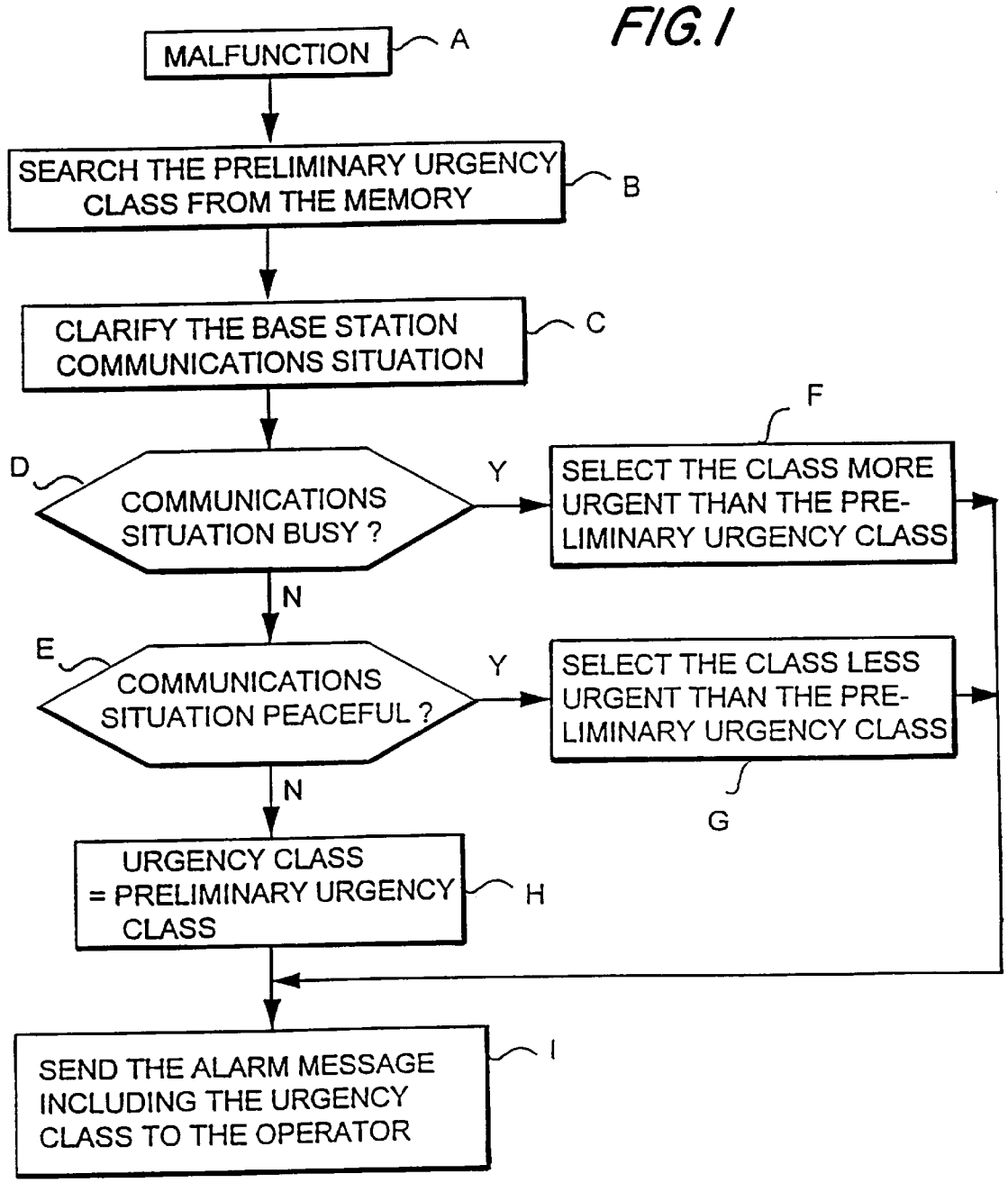

United States Patent [19]
Viljanen et al.

[11] Patent Number: 5,974,313
[45] Date of Patent: Oct. 26, 1999

[54] SYSTEM AND METHOD FOR DEFINING AN URGENCY CLASS OF A DISORDER APPEARING IN A COMMUNICATION SYSTEM STATION

[75] Inventors: Vesa Viljanen, Helsinki; Raimo Pulkkinen, Oulu, both of Finland

[73] Assignee: Telecom Finland Oy, Tele, Finland

[21] Appl. No.: 08/973,940

[22] PCT Filed: Jun. 10, 1996

[86] PCT No.: PCT/FI96/00343

§ 371 Date: May 18, 1998

§ 102(e) Date: May 18, 1998

[87] PCT Pub. No.: WO96/42177

PCT Pub. Date: Dec. 27, 1996

[30] Foreign Application Priority Data

Jun. 8, 1995 [FI] Finland .................... 952831

[51] Int. Cl.⁶ .............. H04Q 7/20; H04Q 7/30; H04Q 7/34; H04M 1/24
[52] U.S. Cl. ................. 455/423; 379/10; 379/15
[58] Field of Search ................ 455/423, 424, 455/67.1, 404, 419, 420, 88, 453, 31.3, 561; 379/9, 10, 15, 34

[56] References Cited

U.S. PATENT DOCUMENTS 4,670,899  6/1987  Brody et al. ................... 455/453
5,016,269  5/1991  Rogers ........................ 455/404
5,394,459  2/1995  Djuphammar et al. ........... 455/424
5,852,649  12/1998  Hodson ........................ 379/9
5,892,758  4/1999  Argyroudis ................... 455/31.3

Primary Examiner—William G. Trost
Assistant Examiner—Raymond B. Persino
Attorney, Agent, or Firm—Cohen, Pontani, Lieberman & Pavane

[57] ABSTRACT

A system and method for determining an urgency class of a disturbance occurring in a base station of a cellular communication system. A list of possible disturbances that can emerge during the functioning of the base station and the preliminary urgency classes determined for the disturbances concerned is maintained in a memory. In order to enable more accurate urgency classification, a preliminary urgency class is searched out from the memory corresponding to disturbances in question. An alarm urgency class is conditioned with the communications state of the base station by detaining a less urgent class than the preliminary urgency class when the communications state of the base station is peaceful (i.e., not busy). When the communication state of the base station is busy, a more urgent class than that of the preliminary urgency class is determined for the alarm.

8 Claims, 2 Drawing Sheets

SYSTEM AND METHOD FOR DEFINING AN URGENCY CLASS OF A DISORDER APPEARING IN A COMMUNICATION SYSTEM STATION

This invention relates to a method for defining an urgency class of a disorder appearing in a base station, in which method a list is maintained in a memory means about the disorders, which may occur in the base station operation, and of the preliminary urgency classes determined for the disorders in question. The invention relates also to a cellular radio system including a base station, comprising transmitter-receiver means for forming a connection with radio units in the radio covering region, memory means for maintaining the list about disorders that can occur in the base station operation and also of the preliminary urgency classes determined for the disorder concerned, and alarm means adapted to search in connection with the base station's malfunction from the memory means the urgency class corresponding the disorder in question as well as to send the alarm message indicating the urgency class to the system operator.

The invention relates particularly to base stations of cellular radio systems and handling of alarms sent from these to the operator. It is already known to utilize for example in connection with the alarm handling of base stations of the NMT (Nordic Mobile Telephone) cellular radio system an urgency classification based on the quality of the fault or disorder emerged in the base station, i.e. the faults that can occur in the base stations have been classified in advance according to the need of urgent measures. When a fault or disorder of certain type then emerges, the alarm system checks first from the memory where the urgency class the disorder in question belongs. After this an alarm is given to the system operator, whereat the urgency class found from the memory is indicated to the operator. The urgency class reveals then to the operator, how he should deal with the alarm or does this mean that the service personnel should visit immediately the base station installation place, or is it possible to postpone the visitation for instance to the next working day.

The most significant weakness of the above-mentioned known solution is, that if the same disturbance emerges in two base stations, the same alarm is given to the system operator, though the disturbances may have entirely different meaning concerning the base station communications throughput. Or if a faulty base station is situated for example along with a busy highway and half of its capacity is lost due to a malfunction, the base station concerned requires naturally much quicker maintenance than for instance in the case, if a base station is a ski resort loses half of its capacity during summer months, when the resort is closed. In these above-mentioned cases both base stations in known systems, however, transmit the alarms belonging to the same urgency class.

The object of the present invention is to solve the above-mentioned problem and to provide a better method for making the urgency classification of base station alarms. This object is achieved by the method according to the invention, which is characterized in that a preliminary urgency class corresponding the disturbance in question is searched from the memory means and the alarm urgency class is proportioned to the communications situation of the base station by determining a less urgent class than the preliminary urgency class for the alarm, if the base station communications situation is at rest, and by determining a more urgent class than the preliminary urgency class, if the base station communications situation is busy.

The invention is based on the idea, that when it is observed in the disturbance urgency classification in addition to the emerged malfunction type also the base station communications situation, or how many phone calls through the base station concerned has lately been made, a method is achieved enabling better than before to sieve out the alarms that do not imply immediate actions. The most outstanding advantage of the method according to the invention comprises therefore the fact, that the emergency classification is based on the actual recent communications situation of the base station, which gives a better conception of the moment, when the service personnel really must do immediate actions.

The invention concerns also relates to a cellular radio system, in which the method according to the invention can be adapted. The cellular radio system according to the invention is characterized in that the alarm means have been supplied to check the communications situation of the base station before sending the alarm message and to change the disturbance urgency class as less urgent, if the communications situation of the base station is peaceful, or correspondingly to change the disturbance urgency class as more urgent, if the communications situation of the base station is busy.

Figure 2:
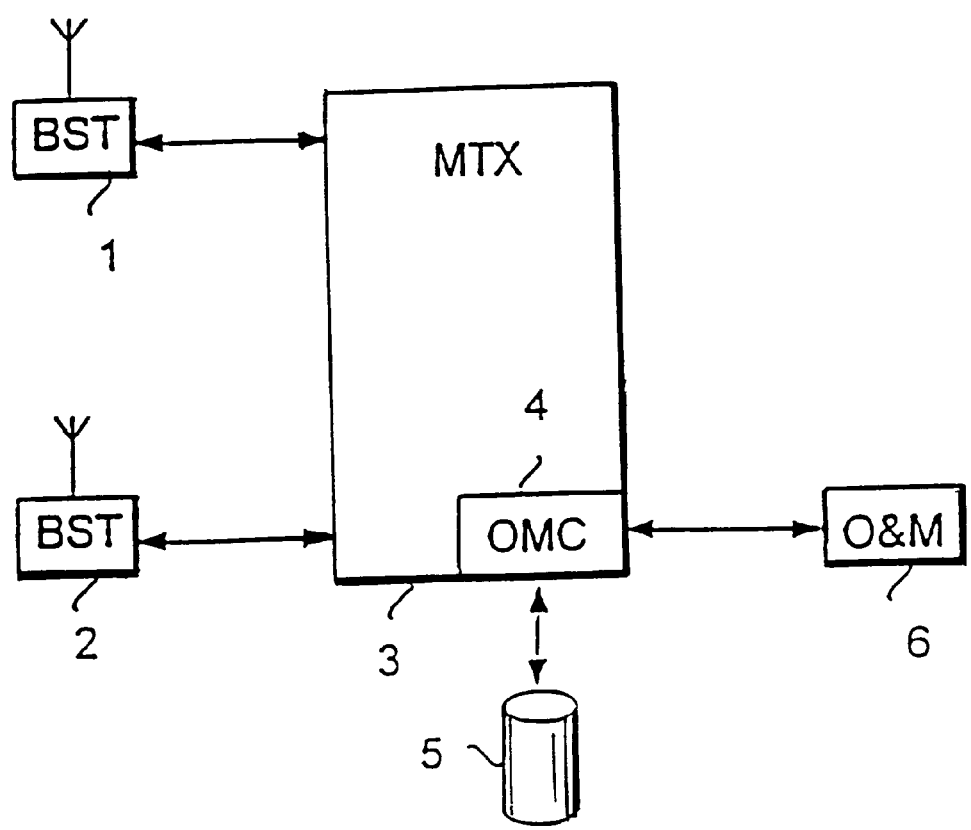

The invention will be described in the following according to a preferred embodiment of the invention with reference to the enclosed figures, in which:

FIG. 1 shows a flow diagram of the first advantageous embodiment of the method according to the invention; and FIG. 2 shows a block diagram of the first advantageous embodiment of the cellular radio system according to the invention.

FIG. 1 shows a flow diagram of the first advantageous embodiment of the method according to the invention. A malfunction occurs in the block A in the base station of the FIG. 1. In question can be for instance a malfunction, due to which one of the base station receivers ceases to function.

In the block B the preliminary urgency class, that has determined in advance for the malfunction concerned, is searched from the table to be maintained in the memory means. Let us assume that the urgency class determined in advance is for instance A4, which means that the disturbance in question does not require any immediate attention.

In the block C the communications situation W of the base station is cleared out. The base station communications situation is cleared preferably once a day, whereat the value indicating the communications situation is deposited to the memory. In addition to this the communications situation can also be defined always, when a malfunction in occurring in the base station. The operator can, if he so desires, determine manually the base station communications situation by depositing the value representing it to said memory. The system can alternatively calculate automatically the communications situation W, whereby in the beginning it is explained, how much of the base station communications capacity has recently been used. This is performed for example in such a way, that the maximum sum of one-hour erlangs in and erlangs out values obtained from the BST-measurements during seven preceding days is searched out from the memory (one erlang corresponds a situation, in which one of the radio channels of the base station has continuously been in use during one hour).

If the results of the BST-measurements are not for some reason available when the communications are cleared out, it is possible to use for instance the equation $W = 0.5 * L2 *$ max., where max.=the maximum number of channels available for a base station in order to form the calculatory communications situation.

Let us assume that for example W=12 has been obtained as the communications situation value W. The received value W is compared with the limit values L1 and L2 determined in advance by the operator, which values can for instance be L1=6 and L3=10, and if then:

W<L1, the base station communications situation is peaceful,

L1≦W<L2, the base station communications situation is normal,

W≧L2, the base station communications situation is busy.

If it turns out, that the communications situation is busy, transfer is made from the block C through the block D to the block F. In the block F it is searched from the alarm definition table a more urgent class than the preliminary urgency class for a busy base station, in which the fault type in question is occurring. Alternatively a class, that is one class more urgent than the preliminary urgency class, or e.g. A3, can simply be selected for the alarm.

If on the contrary it turns out that the communications situation is peaceful, transfer is made from the block C through the block E to the block G. In the block G it is searched from the alarm determination table a less urgent class than the preliminary urgency class for the peaceful base station, in which the fault type in question occurs.

Alternatively an urgency class that is one class lower than the preliminary urgency class, or e.g. A5, can simply be selected for the alarm.

If it turns out that the base station communications situation is normal, transfer is made from the block C through blocks D and E to the block H, where the preliminary urgency class is selected as the final urgency class.

From the blocks P, G and H transfer is made to the block I, where an alarm message known as such is sent to the operator indicating to the operator the urgency class of the malfunction in question.

FIG. 2 shown a block diagram about the first preferred embodiment of the cellular radio system according to the invention. The cellular radio system presented in FIG. 2 may for instance be a NMT-system. In FIG. 2 has been shown a mobile telephone exchange (MTX) 3 that is in a communications connection with two base stations (BST) 1 and 2. The control room 5 of the operator is in connection with the operating and maintenance computer 4 associated with the mobile telephone exchange.

The operator has in advance deposited into the memory means 5, which may comprise for example a hard disk of the operating and maintenance computer 5, a list concerning the disturbances, which may occur in the operation of the base stations 1 and 2, and also the urgency class of these disturbances. Further on, it has been deposited to the memory means 5 information concerning the communications situation of the base stations, or among other things the values L1 and L2, by which the communications situation of the base stations will be classified.

When e.g. in the base station 1 occurs a disturbance, the operating and maintenance computer 4 finds this immediately out, whereby it searches from the memory means 5 its preliminary urgency class (for example A4), that the operator has determined for the disturbance in question. Alternatively the alarm message sent from the base station to the operating and maintenance computer indicate the preliminary urgency class.

When the preliminary urgency class has been cleared, the computer 4 finds out the base station communications situation by searching from the memory means 5 the maximum sum W of hour erlangs in and erlangs out values of the base station received from the BST-measurements of seven preceding days (which sum value it continuously maintains), and also the classification limits L1 and L2 determined by the operator.

Based on values W (for instance 12), L1 (for instance 6) and L2 (for instance 10) the computer states, that the communications situation of the base station 1 is busy. Therefore it selects for the emerged disturbance an urgency class (e.g. A3), that is more urgent than the preliminary urgency class. When the urgency class has been selected, the operating and maintenance computer 4 sends in a known as such manner an alarm message to the control room 6 of the operator, whereby the alarm message in question indicates the urgency class of the malfunction to the operator.

It should be understood, that the preceding description and the figures connected with it are only intended to illustrate the present invention. It is therefore obvious that the determination of the urgency class of the disturbance may alternatively take place entirely in some other part of the system, as e.g. in the base station, though in the preceding example it has been presented, that the urgency classification takes place in the mobile telephone exchange. To the persons skilled in the art may other variations and modifications of the invention will also be obvious without deviating from the scope and spirit of the invention set forth in the enclosed claims.

We claim:

1. A system for determining an urgency class of a disturbance occurring in a communication station subjected to a communication load, comprising:

first defining means for defining a plurality of disturbance types, each of said plural disturbance types corresponding to a unique communication station disturbance;

second defining means for defining a plurality of preliminary urgency classes, each of said plural preliminary urgency classes corresponding to one of said plural disturbance types, wherein each of said plural preliminary urgency classes is of a particular severity level indicative of a severity of said corresponding disturbance type;

memory means operable to store said plurality of disturbance types and said plurality of urgency classes; and first control means for:

(i) identifying, when a particular communication station disturbance occurs, a corresponding particular disturbance type of said plural disturbance types;

(ii) identifying a particular preliminary urgency class corresponding to said identified particular disturbance type; and (iii) determining whether the communication load of the communication station is one of a low load and a high load, and (A) when the communication load is determined to be low, (1) decreasing said severity level of said identified particular preliminary urgency class to a low severity level, and (2) generating an urgency class output of said low severity level, so that said urgency class output is indicative of said severity of said identified particular communication station disturbance and of the magnitude of the communication load; and (B) when the communication load is determined to be high, (3) increasing said severity level of said identified particular preliminary urgency class to a high severity level, and (4) generating an urgency class output of said high severity level, so that said urgency class output is indicative of said severity of said identified particular communication station disturbance and of the magnitude of the communication load.

2. The system of claim 1, wherein said control means further comprises:

measuring means for measuring, over a predetermined time period, a current communication load level of said communication station; and comparing means for comparing said current communication load level to a first and a second predetermined load value, and (i) when said current communication load level is lower than said first predetermined load value, indicating that the communication load is a low load, and (ii) when said current communication load level is higher than said second predetermined load value, indicating that the communication load is a high load.

3. A communication system monitored by a system operator, comprising:

a communication station having a receiver and a transmitter for communicating with remote mobile communication units in a predetermined coverage area, wherein said communication station is subjected to a communication load;

first defining means in the communication station for defining a plurality of disturbance types, each of said plural disturbance types corresponding to a unique disturbance that may occur in said communication station;

second defining means in the communication station for defining a plurality of preliminary urgency classes, each of said plural preliminary urgency classes corresponding to one of said plural disturbance types, wherein each of said plural preliminary urgency classes is of a particular severity level indicative of a severity of said corresponding disturbance type;

memory means in the communication station operable for storing said plurality of disturbance types and said plurality of urgency classes; and alarm means in the communication station for:

(i) identifying, when a particular disturbance occurs in said communication station, a corresponding particular disturbance type of said plural disturbance types;

(ii) identifying a particular preliminary urgency class corresponding to said identified particular disturbance type; and (iii) determining whether the communication load of said communication station is one of a low load and a high load, and (A) when the communication load is determined to be low, (1) decreasing said severity level of said identified particular preliminary urgency class to a low severity level, and (2) transmitting an urgency class alarm signal of said low severity level to the system operator to permit the system operator to assess said alarm signal; and (B) when the communication load is determined to be high, (3) increasing said severity level of said identified particular preliminary urgency class to a high severity level, and (4) transmitting an urgency class alarm signal of said high severity level to the system operator to permit the system operator to assess said alarm signal.

4. The system of claim 3, wherein said alarm means further comprises:

measuring means for measuring, over a predetermined time period, a current communication load level of said communication station; and comparing means for comparing said current communication load level to a first and a second predetermined load value, and (i) when said current communication load level is lower than said first predetermined load value, indicating that the communication load is a low load, and (ii) when said current communication load level is higher than said second predetermined load value, indicating that the communication load is a high load.

5. The system of claim 4, wherein said measuring means comprises means for (i) measuring a plurality of sums of erlangs in values and erlangs out values over said predetermined time period;

(ii) storing said measured plural sums in said memory means;

(iii) determining a maximum value sum of said measured plural sums; and (iv) setting said current communication load level to said maximum value sum.

6. The system of claim 5, wherein said predetermined time period is seven days.

7. A method for determining an urgency class of a disturbance occurring in a communication station subjected to a communication load, comprising the steps of:

(a) defining a plurality of disturbance types, each of said plural disturbance types corresponding to a unique communication station disturbance;

(b) defining a plurality of preliminary urgency classes, each of said plural preliminary urgency classes corresponding to one of said plural disturbance types, wherein each of said plural preliminary urgency classes is of a particular severity level indicative of a severity of said corresponding disturbance type;

(c) storing said plurality of disturbance types and said plurality of urgency classes;

(d) identifying, when a particular communication station disturbance occurs, a corresponding particular disturbance type of said plural disturbance types;

(e) identifying a particular preliminary urgency class corresponding to said identified particular disturbance type; and (f) determining whether the communication load of the communication station is one of a low load and a high load, and (A) when the communication load is determined to be low, (1) decreasing said severity level of said particular preliminary urgency class to a low severity level, and (2) generating an urgency class output of said low severity level, so that said urgency class output is indicative of said severity of said particular communication station disturbance and of the magnitude of the communication load; and (B) when the communication load is determined to be high, (3) increasing said severity level of said particular preliminary urgency class to a high severity level, and (4) generating an urgency class output of said high severity level, so that said urgency class output is indicative of said severity of said particular communication station disturbance and of the magnitude of the communication load.

8. The method of claim 7, wherein said step (f) further comprises the steps of:

(g) measuring, over a predetermined time period, a current communication load level of said communication station; and (h) comparing said current communication load level to a first and a second predetermined load value, and (C) when said current communication load level is lower than said first predetermined load value, indicating that the communication load is a low load, and (D) when said current communication load level is higher than said second predetermined load value, indicating that the communication load is a high load.

* * * * *